Aug. 31, 1943.  W. H. SILVER  2,328,174
LISTER
Filed Sept. 23, 1940   3 Sheets-Sheet 1

INVENTOR:
WALTER H. SILVER
BY *[signature]*
ATTORNEYS.

Aug. 31, 1943.     W. H. SILVER     2,328,174
LISTER
Filed Sept. 23, 1940     3 Sheets-Sheet 2
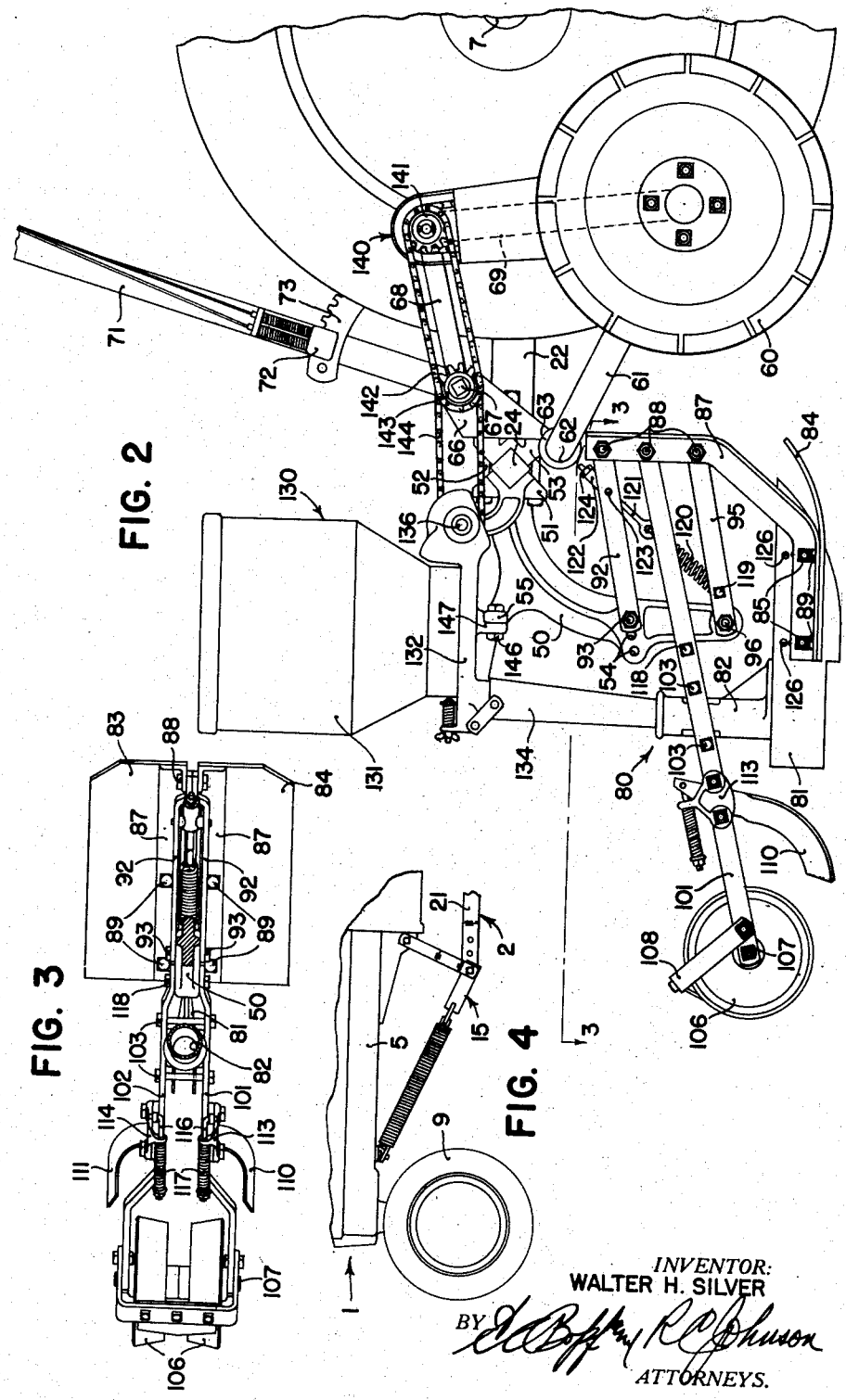
INVENTOR:
WALTER H. SILVER
BY
ATTORNEYS.

Aug. 31, 1943.        W. H. SILVER         2,328,174
                        LISTER
              Filed Sept. 23, 1940        3 Sheets-Sheet 3

INVENTOR:
WALTER H. SILVER
BY
ATTORNEYS.

Patented Aug. 31, 1943

2,328,174

UNITED STATES PATENT OFFICE 2,328,174

LISTER

Walter H. Silver, Moline, Ill., assignor to Deere & Company, Moline, Ill., a corporation of Illinois Application September 23, 1940, Serial No. 357,885

29 Claims. (Cl. 111—59)

The present invention relates generally to agricultural machines and is more particularly concerned with tractor mounted implements in which a tool frame, such as a lister or bedder frame, is pivotally connected to the tractor for generally vertical movement and receives a plurality of operating units, such as lister, cultivator, or planter units, which are connected for floating movement to the tool frame.

The object and general nature of the present invention is the provision of an agricultural machine of this character wherein forwardly extending parts are secured to the tool frame and receive the independently movable operating units. One advantage of this construction is that the implement and tractor are relatively closely coupled, yet there is no interference between the implement parts and the rear wheels or other traction means of the tractor.

Another feature of the present invention is the provision of new and improved means limiting the relative free vertical movement of the several operating units relative to the tool frame, and the provision of means on the tractor for raising the tool frame and hence, also, all of the operating units out of their operating position. More specifically, it is a feature of the present invention to provide planting attachments for listers and bedders.

These and other objects and advantages of the present invention will be apparent to those skilled in the art after a consideration of the following detailed description of the preferred embodiments, taken in conjunction with the accompanying drawings.

In the drawings:

Figure 2 is a side view of the rear portion of the machine, showing in particular the floating connections between the planting means and the tool frame;

Figure 3 is a section taken generally along the line 3—3 of Figure 2;

Figure 4 shows the manner of connecting the lister or bedder frame with the tractor.

Figure 1:
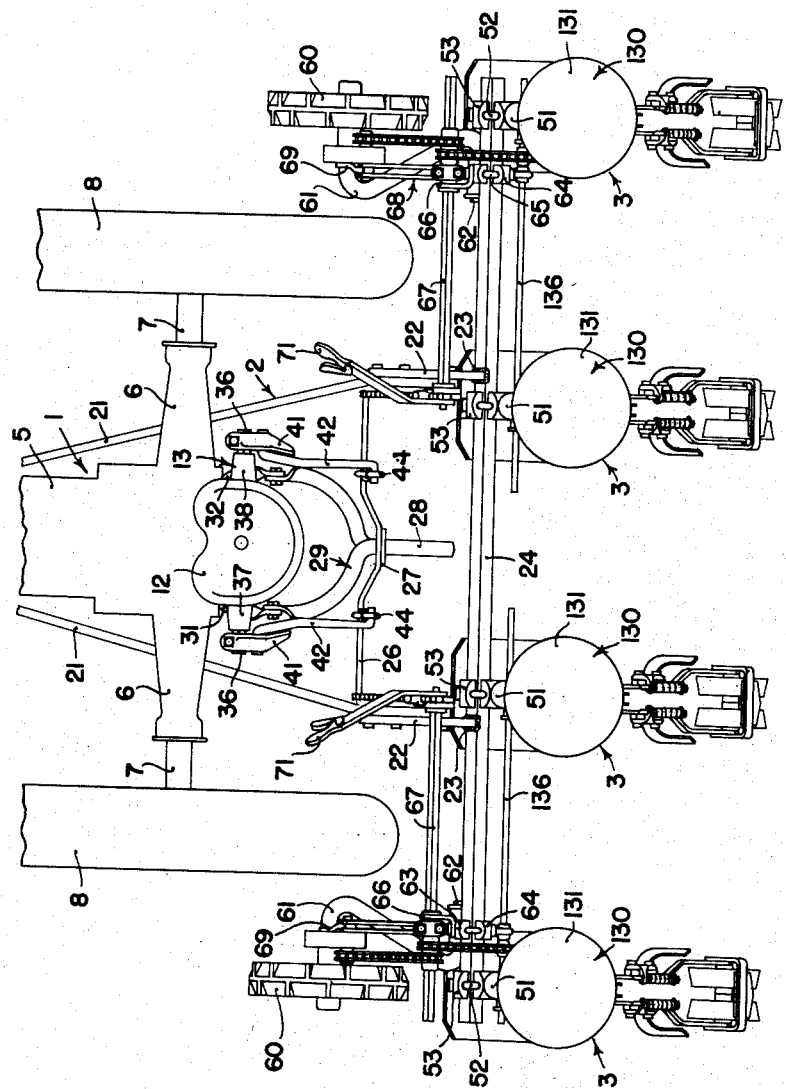
Figure 1 is a top plan view of a machine in which the principles of the present invention have been embodied, illustrating the tool frame of a lister or bedder equipped with four planting units floatingly connected with the rear transverse bar of the tool frame.

Referring now more particularly to Figures 1, 2 and 3, the machine chosen to illustrate this embodiment of the present invention comprises a tractor indicated in its entirety by the reference numeral 1, a tool frame 2 and a plurality of planting units 3. The tractor 1 is of well-known construction embodying frame means 5 and rear axle extensions 6 in which axle shafts 7 are journaled. The latter carry rear traction means in the form of wheels 8. The front end of the tractor is supported in the usual manner by a dirigible front truck 9. The operator's seat on the tractor is indicated at 12, and the tractor is provided with power lift mechanism indicated at 13 to which more detailed reference will be made later.

The tool frame 2 is of the general construction shown in my prior Patent Re. 21,266, issued November 14, 1939. The tool frame 2 consists of generally forwardly extending frame bars 21 which may converge toward their forward ends and are pivotally connected through suitable hitch means 15 to the forward portion of the tractor. Such hitch means may be spring cushioned or longitudinally adjustable as shown in Figure 4 and in my prior patent. The rear ends of the frame bars 21 are bolted to plates 22 that are secured, as by welding 23, to a transverse tool frame section 24, preferably in the form of a square bar which extends laterally of the tractor beyond the rear traction wheels 8, as best shown in Figure 1. The frame bars 21 are connected together adjacent their rear ends by a brace member 26 which carries a slotted plate 27 suitably fixed to the central portion thereof. The slot in the plate 27 receives the rear end 28 of a Y-shaped member 29, the forward ends of which are pivoted to the rear portion of the tractor in any suitable way, as being pivoted to brackets 31 and 32 which are bolted to the under side of the rear axle housing. The frame 2 is thus connected for generally vertical swinging movement relative to the tractor, but lateral movement of the frame 2 is restrained by the member 29.

The frame 2 is raised and lowered by suitable connections with the tractor power lift 13. The latter includes a transversely disposed rock shaft 36 which extends laterally outwardly of the sleeve sections 37 and 38 of the power lift casing. A lifting arm 41 is fixed to each end of the power lift rock shaft 36 and has pivoted thereto an arm extension 42 that extends rearwardly to a point substantially directly over the transverse brace member 26. A link 44 extends downwardly from the outer end of each of the arms 42 to the brace member 26 so that the frame 2 will be raised when the rock shaft 36 is actuated in one direction. The connections between the arms 41 and the arm extensions 42 are such that the latter may swing freely upwardly relative to the arms 41. In effect, as will be readily understood, this provides a floating connection between the frame 2 and the tractor 1 when the arms 41 on the power lift rock shaft 36 are rocked downwardly, but when the arms 41 are swung upwardly, the outer ends of the latter engage underneath the arm extensions 42, serving thereby to raise the latter and the tool or implement frame 2 connected therewith.

When used as a lister, middlebreaker or bedder, one or more beams 50, preferably of cast steel, are fixed in a proper lateral position to the transverse bar 24. To this end, the upper end 51 of the beam 50 is formed with a V-shaped socket and is apertured to receive clamping bolts 52 by which a cap 53, which also has a V-shaped socket, is clamped against the forward side of the bar 24. As best shown in Figure 2, each beam 50 curves downwardly and rearwardly and at its lower end is apertured to receive the standards by which a conventional lister bottom or sweep is normally connected to the standard 50. Generally, there is an opening in the lowermost portion of each standard 50 and a series of several openings, indicated in Figure 2 by the reference numeral 54, above the lower opening. A rearwardly extending lug 55 is formed on each beam 50 to receive the seed holding and selecting mechanism to which reference will be made below.

The position of the implement frame 2 relative to the ground is controlled by a pair of gauge wheels 60. Each gauge wheel is mounted on a vertically swingable crank axle 61, the rear or journal portion 62 of which is received in a suitable bearing sleeve at the lower end of a bracket casting 63 which is clamped to the bar 24 by a cap 64 and bolts 65. The clamping bolts 65 also serve to support an angle bracket 66 in which a shaft 67 is supported for rocking movement.

An arm 68 is fixed to the outer end of each shaft and is connected through a link 69 (Figure 1) to the gauge wheel supporting axle end of the crank axle 61. The inner end of each of the shafts 67 is supported for rocking movement in a bracket fixed to the rear end of the associated frame bar 21, and to the inner end of each of the shafts 67 is fixed a hand lever 71 having ratchet mechanism 72 cooperating with a sector 73, also connected to the associated frame bar 21. By loosening the clamping means 64, the gauge wheel 60 and associated parts may be moved to different adjusted positions along the square bar 24.

The construction described above, when lister bottoms or other listing tools are fixed to the lower ends of the beams 50, forms a lister, bedder or middlebreaker, and I do not in this application claim the particular features per se of the implement frame or gauge wheels, since such are included in the features disclosed and claimed in my prior patent mentioned above. According to the present invention, I make use of the tool frame of a lister, including the lister bottom supporting beams, to provide improved planting means in the nature of attachments for a lister frame.

Referring now more particularly Figures 2 and 3, a planting attachment, indicated in its entirety by the reference numeral 80, is floatingly connected to each of the lister bottom supporting beams 50. Preferably, each planting attachment 80 consists of a runner 81, which when drawn through the soil forms a seed receiving furrow, a runner shank 82 which is hollow and receives the seed to be planted, and a pair of gauge shoes 83 and 84 (Figure 3). Bolted, as at 85, to opposite sides of each runner 80, is a pair of angles 87 which extend generally forwardly and upwardly from the front portion of the associated runner 81. The upper vertical sections of the angles 87 are apertured to receive three pivot bolts 88 (Figure 2). The lower horizontal flanges of the angles 87 are apertured to receive bolts 89 by which the left and right hand gauge shoes 83 and 84 are fixed in position.

Mounted on the upper pivot bolt 88 of each of the planter units 80, is a pair of straps 92 forming the upper of a pair of parallel links connecting the angles 87 to the beam 50. The upper pair of straps 92 are apertured at their rear end and receive a pivot bolt 93 which is disposed in one of the openings 54 in the associated frame beam 50. A lower pair of straps 95, which may be of substantially identical construction to the straps 92, are pivoted at their forward ends on the lower bolt 88 and at their rear ends are apertured to receive a pivot bolt 96 disposed in the lower apertured end of the associated lister bottom beam 50. The pairs of straps 92 and 95 thus form a pair of generally parallel links connecting the runner 80 for relatively free vertical floating movement with respect to the beam 50. The links 92 and 95 thus form draft transmitting parts which not only accommodate the aforesaid floating movement, but also cause the associated runner 80 to be drawn through the soil during the forward travel of the machine.

A pair of relatively long straps 101 and 102 (Figure 2) are pivoted at their forward ends on the intermediate bolt 88 and extend in spaced apart relation on opposite sides but in sliding contact with the lower portion on the lister bottom beams 50, rearwardly of which the straps 101 and 102 are bolted as at 103 to the runner shank 82. The links or straps 101 and 102 extend rearwardly beyond the runner shank 82 and are bent so as to be spaced apart at their rear ends (Figure 3) and to receive a pair of press wheels 106 journaled for rotation between the spaced apart ends upon an axle 107. The straps or links 101 and 102 thus serve as a frame which forms a part of the runner unit 80 and which extends rearwardly to support the press wheels 106 in the proper position relative to the runner 81. The frame 101, 102 also serves to support a pair of knife coverers 110 and 111 which are pivoted, respectively, to brackets 113 and 114 and held in proper position by a pair of links 116 and springs 117. A bolt 118 with a suitable spacer (not shown) connects the two straps 101 and 102 just rearwardly of the beam 50 so as to maintain the portions of the straps 101 and 102 in proper position for guiding the movement of the runner unit 80 relative to the beam 50, as permitted by the parallel links 92 and 95.

A spring 120 is connected at its lower end to a bolt 119 which is carried adjacent the rear end of the lower link 95. The upper end of the spring 120 is connected to a link 121 adjustably secured in a sleeve 122 which is pivoted, as at 123, to the upper links 92. A nut 124 is threaded onto the upper end of the link 121 so as to provide for adjusting the tension of the spring 120, the effect of which is to urge the runner unit 80 downwardly into furrow opening position. The gauge shoes 83 and 84 limit the amount of penetration under the influence of the spring 120 and the action of gravity. The runner 81 is provided with a plurality of holes 126 so that the bolts 85 may be disposed at various positions to adjust the amount of penetration. While the spring 120 normally exerts sufficient force to hold the runner in the ground, if the runner should encounter an obstruction the spring 120 yields to permit the unit 80 to move upwardly. During this movement, the unit 80 moves generally parallel to itself, by virtue of the parallel links 92, 95, the straps 101 and 102 sliding on opposite sides of the beam 50 and, being bolted at 103 to the runner shank 82, the links 101 and 102 hold the press wheels 106 at all times in the proper position relative to the runner 81. Also, as shown in Figure 3, the straps 101 are disposed generally in the planes of the pivoted upper and lower links 92 and 95, whereby by engaging the links, the straps 101 serve as stops or lost motion means limiting the vertical floating movement of the runner 81.

The seed holding and selecting mechanism is indicated in its entirety by the reference numeral 130 and comprises a seed can 131 carried on a base 132 which includes a conventional seed selecting mechanism. The seed selected is discharged through a seed tube 134 into the hollow runner shank 82. The seed selecting mechanism is driven by a shaft 136 which, as best shown in Figure 1, extends from the outermost operating unit at one side of the tractor to the innermost unit at that side. In a four row machine there are, of course, two units on each side of the tractor, the two units at each side being driven through suitable connections with the gauge wheel 60 at that side. As best shown in Figure 2, the driving connections for the seeding shaft 136 consists of a sprocket and chain unit 140 driven from the gauge wheel 160 and which includes a double sprocket unit 141 mounted for rotation coincidental with the axis of pivotal connection between the arm 68 and the link 69. A double sprocket 141 is connected by a sprocket chain 142 to a second double sprocket 143, and the latter is connected by a sprocket chain 144 to a sprocket on the shaft 136, as best shown in Figure 1. Thus, movement of the lever 71 to dispose the gauge wheel 60 in various positions relative to the implement frame does not affect the driving connection between the gauge wheel and the seed selecting shaft 136. The seed can and base 131 is supported by a pair of bolts 146 extending through a lug 147 carried by the base 132, the bolts 146 passing through apertures in the lug 55 on the beam 50. The base 132 supports the seeding shaft 136.

Figure 5:
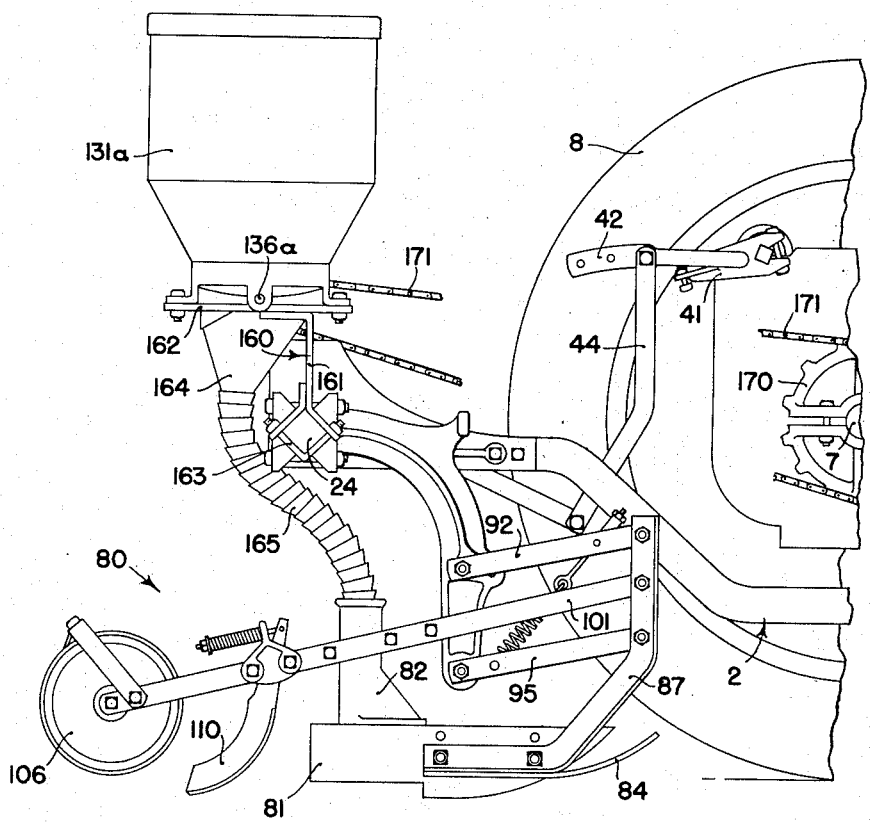
Figure 5 is a view similar to Figure 2, showing a modified view of the present invention in which the gauge wheels and adjusting levers therefor have been eliminated.

Figure 5 shows a modified form of the present invention in which the gauge wheels 60, the adjusting levers 71 and associated parts have been omitted, including the driving mechanisms 140. Instead, the lister shanks 50 are mounted so as to extend forwardly and downwardly from the tool bar 24 so as to dispose the planting units 80 closer to the tractor. Since the gauge wheels 60 have been omitted, the implement frame 2 is supported by the tractor and the drive for the seeding shaft is taken from one or both of the tractor rear wheels 8.

Referring now more particularly to Figure 5, a plurality of seed can supporting brackets 160, there being four inasmuch as the implement shown in Figure 5 is a four-row implement, like that shown in Figure 1, are mounted on the cross bar 24. Preferably, each of the brackets 160 consists of a strap member 161 disposed vertically and forked at its lower end to receive a V-shaped bolt 163 which clamps the lower end of the strap 161 in place. At the upper end of the strap 161 is a horizontal member 162 upon which the seed can 131a is fixed. In this form of the invention the seeding units are slightly different from the seeding units 130 shown in Figure 2. In Figure 5 the seed cans 131a are of the side delivery, or sight feed, type and include seed selecting mechanism connected to be driven by the seeding shaft 136a. The seed selected is ejected through a spout 164 which discharges into a seed tube 165, the lower end of which enters the seed boot or shank 82. It will be noted that when the lister beam shanks 50 are reversed, as in Figure 5, so as to be disposed in a forward position, the forwardly extending links 92 and 95 support the angle member 87 in a position alongside the rear tractor wheel 8, generally in about the same position, so far as the outer units are concerned, as the gauge wheel 60, shown in Figures 1 and 2. It will be seen that this construction provides a compact and closely coupled outfit.

In view of the fact that in Figure 5 the gauge wheels 60 have been omitted, it becomes necessary to support the implement frame 2 from the tractor, both when the tools are raised and when they are in operating position. In Figure 5 the implement frame is supported by virtue of the connections 44 to the lifting arms 42, the connections being arranged, as indicated in Figure 5, so that when the power lift is lowered the weight of the frame 2 is sustained by the power lift mechanism 13. It is not necessary, however, to have the power lift of the tractor support the weight of the various planting units 80, for these units, being arranged as shown in Figure 2, are floatingly connected by the parallel links 92 and 95 so that the weight of the units is supported upon the gauge shoes 83 and 84. In this form of the invention, as in Figure 2, the engagement of the straps with the links 92 and 95 serves as stops or lost motion means limiting the vertical floating movement of the planter furrow openers. In Figure 5 the weight of the implement frame and the seed cans is supported on the tractor.

In Figures 1 and 2 the seeding mechanisms of the several units are driven from the gauge wheels 60, but in the form of the invention shown in Figure 5 in which the gauge wheels have been omitted, the seeding mechanisms are arranged to be driven from the rear tractor wheels 8. The driving mechanism shown in Figure 5 is substantially the same as the driving mechanism disclosed and claimed in my co-pending application mentioned above. Since the details of the driving mechanism are claimed in another application, no claims to the driving mechanism per se are made in this application.

Briefly, the driving mechanism for the form shown in Figure 5 comprises a driving sprocket 170 fixed to each axle 7 inside the associated rear wheel 8, each sprocket 170 being of the two-part separable type to facilitate connecting and disconnecting the same from the associated driving axle. A sprocket chain 171 is trained about the driving sprocket 170 and extends rearwardly where it passes around a sprocket pinion mounted on a shaft that carries a gear that meshes with an intermediate gear which, in turn, meshes with a gear that drives the seeding shaft 136a, as disclosed in said co-pending application. Provision is made for adjusting the effective length of the chain 171 so that when the frame 2 is raised and lowered the chain 171 is shortened or lengthened by a corresponding amount. A spring serves to keep the chain tight at all times and takes care of irregularities during operation. It will be understood that there is a driving chain 171 and associated driving and adjusting connections at each side of the tractor so that each seeding shaft 136a, which corresponds to the seeding shaft 136 shown in Figure 11, has its own drive. If desired, however, by connecting the two seeding shaft sections only one driving connection is necessary. However, I prefer to drive each seeding shaft section from its associated rear tractor wheel.

While I have shown and described above the preferred forms in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising the combination with a tractor of a tool frame including generally forwardly extending frame bars and a transverse bar connected with the rear end portions of said frame bars, means connecting the forward ends of said forwardly extending bars to the forward portion of the tractor, seed holding and selecting mechanism, bracket means supporting said mechanism generally rearwardly of said transverse bar, brackets fixed to said transverse bar, a plurality of furrow opening means, sets of generally parallel links connected at their rear ends to said brackets and extending generally forwardly therefrom and connected to the forward portion of said furrow opening means so as to dispose the rear portion of the latter in a position to receive seed from said mechanism.

2. A planter attachment for a tractor, comprising a transverse member, a bracket carried by said member, a pair of spaced approximately parallel links extending generally forwardly from said bracket, a member connecting the forward ends of said links, and planting means carried by said transverse member.

3. A multi-row planter comprising a tractor having rear wheels, an implement frame connected with said tractor for relative floating movement, a pair of gauge wheels extending forwardly and disposed at the laterally outer sides of said rear wheels for said tractor, a plurality of planting units, and means including generally forwardly extending links connected at their rear ends with said implement frame and at their forward ends with said units for floatingly connecting the latter with said implement frame.

4. A multi-row planter comprising a tractor, an implement frame connected with said tractor for relative floating movement and including a transverse rear frame bar, a pair of gauge wheels for said frame secured to said frame bar, a plurality of planting units including seeding mechanism and a runner for each unit floatingly connected with said implement frame, and means for driving said seeding mechanism from at least one of said gauge wheels.

5. An agricultural implement comprising the combination with a tractor, of a lister frame including generally forwardly extending frame members pivotally connected with the tractor, a transverse tool bar at the rear ends of said forwardly extending frame members, a plurality of generally downwardly extending lister beams connected with said transverse tool bar, and a plurality of planting units, each including a seed container carried by said lister frame, a seed furrow opener arranged to receive seed from said container and including a draft part disposed ahead of said lister beam, and link means extending forwardly from said lister beam to said draft part for floatingly connecting said seed furrow opener with the associated lister beam.

6. A tractor propelled implement comprising a lister frame including generally forwardly extending frame members adapted to be pivotally connected with the tractor, a transverse tool bar at the rear ends of said forwardly extending frame members, a plurality of generally downwardly extending lister beams connected with said transverse tool bar, a plurality of planting units, each including a seed container carried by said frame, a seed furrow opener arranged to receive seed from said container, and link means floatingly connecting said seed furrow opener with the associated lister beam, each of said lister beams curving generally downwardly and rearwardly with respect to the tool bar to which they are connected and said link means extending generally forwardly from the lower ends of said lister beams, and gauge wheels movably connected with said lister frame.

7. A tractor propelled implement comprising a lister frame including generally forwardly extending frame members adapted to be pivotally connected with the tractor, a transverse tool bar at the rear ends of said forwardly extending frame members, a plurality of generally downwardly extending lister beams connected with said transverse tool bar, a plurality of planting units, each including a seed container carried by said frame, a seed furrow opener arranged to receive seed from said container, and link means floatingly connecting said seed furrow opener with the associated lister beam, and means for supporting the rear end of the frame on the tractor and said lister beams extending generally downwardly and forwardly with respect to the tool bar to which they are connected, and said link means extending generally forwardly from the lower ends of said lister beams.

8. The combination with a bedder frame adapted to be connected with a tractor and including a transverse tool bar at the rear of the tractor and depending tool shanks adapted to be secured to said tool bar with the lower end either forward or rearward of the tool bar and extending generally downwardly therefrom, of seed holding and selecting mechanism, bracket means separate from said tool shanks for supporting said mechanism on the rear end of said bedder frame, ground engaging seed furrow opening means, and means floatingly connecting said furrow opening means with said depending tool shanks.

9. The combination with a bedder frame adapted to be connected with a tractor and including a transverse tool bar at the rear of the tractor and depending tool shanks secured to said tool bar and extending generally downwardly therefrom, of seed holding and selecting mechanism, means connecting said mechanism with said tool bar substantially above said tool shanks, ground engaging seed furrow opening means extending generally longitudinally and forwardly of said tool shanks substantially underneath said seed holding and selecting mechanism, and forwardly extending link means connected at the rear end to said depending tool shanks and at the forward end to said furrow opening means for floatingly connecting said furrow opening means with said depending tool shanks.

10. An agricultural implement comprising the combination with a tractor, of a lister frame including generally forwardly extending frame members pivotally connected with the tractor, a transverse tool bar at the rear ends of said longitudinally extending frame bars, a plurality of brackets fixed to said tool bar, a plurality of ground engaging units, a pair of generally vertically spaced links floatingly connecting each unit with the associated bracket, and means including a part disposed between the links of each pair to be engaged by the links for limiting the movement of each unit relative to the tool bar.

11. An agricultural implement comprising a supporting frame having a depending bracket, a ground engaging unit having an upstanding portion at its forward end, and a pair of spaced approximately parallel links extending generally forwardly from said bracket and connected with said upstanding portion for floatingly connecting said unit with said frame.

12. An agricultural implement comprising a supporting frame having a depending bracket, a ground engaging unit having an upstanding portion at its forward end, a pair of spaced approximately parallel links extending generally forwardly from said bracket and connected with said upstanding portion for floatingly connecting said unit with said frame, and a part fixed against movement relative to said unit and engageable with at least one of said links for limiting the movement of said unit relative to said frame.

13. A planting unit comprising a furrow opener having a seed boot, an upstanding part fixed to the forward portion of said furrow opener, a press wheel frame fixed to said seed boot and to said upstanding part, and a pair of attaching links pivoted to said upstanding part and extending generally rearwardly alongside said press wheel frame.

14. A planter comprising a supporting frame having a generally vertically disposed bracket, a seed furrow opener having an upstanding portion fixed to the forward portion of said furrow opener, a press wheel frame fixed to said furrow opener and including laterally spaced parts on opposite sides of said bracket, and a pair of attaching links pivoted to said upstanding portion at their forward ends and to said bracket at their rear ends.

15. A planter comprising a supporting frame having a generally vertically disposed bracket, a seed furrow opener having an upstanding portion fixed to the forward portion of said furrow opener, the latter having a seed boot, a press wheel frame comprising a pair of laterally spaced apart members disposed on opposite sides of said bracket and fixed to opposite sides of said seed boot and to the upstanding portion of said furrow opener, and a pair of attaching links pivoted to said upstanding portion and to said bracket.

16. A planting unit comprising a furrow opener having upstanding parts adjacent the front and rear portions thereof, a press wheel frame secured to both of said parts for movement with said furrow opener, and a pair of attaching links pivoted to the front upstanding part at points above and below the press wheel frame.

17. A planting unit comprising a furrow opener having upstanding parts adjacent the front and rear portions thereof, a press wheel frame secured to both of said parts for movement with said furrow opener, and a pair of rearwardly extending links pivoted at their forward ends to the front upstanding part at points above and below the press wheel frame.

18. A planter including a planting unit and a member with which said unit is adapted to be connected, said unit comprising a seed furrow opener, a pair of vertically spaced links pivoted to a part of the furrow opener and adapted to be pivoted to said member, and a press wheel frame fixed to said furrow opener in a position between said links whereby said press wheel frame serves to limit the swinging movement of said links.

19. The combination with a bedder frame adapted to be connected with a tractor and including a transverse tool bar at the rear of the tractor and depending tool shanks secured to said tool bar and extending generally downwardly therefrom, of seed holding and selecting mechanism, means connecting said mechanism with said tool bar substantially above said tool shanks, ground engaging seed furrow opening means extending generally longitudinally and forwardly of said tool shanks substantially underneath said seed holding and selecting mechanism, a generally upwardly extending bracket means secured to the forward end of said longitudinally extending furrow opening means, and forwardly extending link means connecting at the rear end to said depending tool shanks and at the forward end to said upwardly extending bracket means for floatingly connecting said furrow opening means with said depending tool shanks.

20. The combination with a frame adapted to be connected with a tractor and including a transverse tool bar at the rear of the tractor and depending tool shanks secured to said tool bar and extending generally downwardly therefrom, of seed holding and selecting mechanism, means supporting said seed holding and selecting mechanism on said tool bar, ground engaging seed furrow opening means, link means floatingly connecting said furrow opening means with said depending tool shanks, and means engageable with said link means for raising said seed furrow opening means.

21. An agricultural implement comprising a supporting frame having a depending bracket, a ground engaging unit having an upstanding portion at its forward end, a pair of spaced approximately parallel links extending generally forwardly from said bracket and connected with said upstanding portion for floatingly connecting said unit with said frame, and means disposed in a position to be engaged by at least one of said links for limiting the movement of said unit relative to said bracket.

22. An agricultural implement comprising a supporting frame having a depending bracket, a ground engaging unit having an upstanding portion at its forward end, a pair of spaced approximately parallel links extending generally forwardly from said bracket and connected with said upstanding portion for floatingly connecting said unit with said frame, and means carried on said upstanding portion in a position to be engaged by at least one of said links for limiting the movement of said unit relative to said bracket.

23. An agricultural implement comprising a supporting frame having a depending bracket, a ground engaging unit having an upstanding portion at its forward end, a pair of spaced approximately parallel links extending generally forwardly from said bracket and connected with said upstanding portion for floatingly connecting said unit with said frame, and means extending from said upstanding portion to the rear part of said ground engaging unit and disposed in a position to be engaged by at least one of said links for limiting the movement of said unit relative to said bracket.

24. A planting unit comprising a furrow opener having a seed boot, a press wheel frame fixed to said seed boot, and a pair of attaching links pivoted to said furrow opener and extending alongside said press wheel frame so as to be limited in its movement by the latter.

25. A planting unit comprising bracket means, a furrow opener having a seed boot, a press wheel frame fixed to said seed boot, and a pair of attaching links pivoted to said furrow opener and said bracket means and engageable with said press wheel frame for limiting the movement of said furrow opener.

26. A planting unit comprising a furrow opener, bracket means with which said furrow opener is movably connected, a press wheel frame connected with said furrow opener, and motion limiting means cooperating with said press wheel frame for limiting the movement of said furrow opener relative to said bracket means.

27. A planter comprising a supporting frame having a generally vertically disposed bracket, a seed furrow opener movably connected with said bracket, a press wheel frame fixed to said furrow opener, and means acting between said press wheel and said bracket for limiting the movement of said furrow opener relative thereto.

28. A planter comprising a supporting frame having a generally vertically disposed bracket, a seed furrow opener, a press wheel frame fixed to said furrow opener and including laterally spaced parts on opposite sides of said bracket, and means movably connecting said furrow opener with said bracket, relative movement between said furrow opener and said bracket being guided by said laterally spaced parts of the press wheel frame.

29. A planter attachment for a tractor, comprising a transverse member, a bracket carried by said member, a pair of spaced approximately parallel links extending generally forwardly from said bracket, a member connecting the forward ends of said links, and planting means carried by said last mentioned connecting member.

WALTER H. SILVER.